United States Patent

Bergmeyer et al.

[15] 3,657,071

[45] Apr. 18, 1972

[54] FRACTIONATION OF PROTEINS

[72] Inventors: Hans Ulrich Bergmeyer, Tutzing/Oberbayern, Bahnhofstrasse 5a.; Hans Mollering, Tutzing/Oberbayern Waldschmidtstrasse 5., both of Tutzing/Oberbayern, Germany

[22] Filed: Nov. 12, 1968

[21] Appl. No.: 775,197

[52] U.S. Cl. .........................................195/66 R
[51] Int. Cl. ..........................................C07g 7/02
[58] Field of Search ..................195/62, 66, 68, 31

[56] References Cited

OTHER PUBLICATIONS

Weidenhagen, et al., Chemical Abstracts. 1940. Vol. 34. (2867–2869).

Decker, et al., Chemical Abstracts. 1957 vol. 51 (14852b).
Dixon, et al., Enzymes. Academic Pres Inc., N.Y. 1964 2nd ed. (pages 35–41 & 44–49) QP601. D5eC.2

*Primary Examiner*—A. Louis Monacell
*Assistant Examiner*—D. M. Naff
*Attorney*—Burgess, Dinklage & Sprung

[57] ABSTRACT

Process for fractionating proteins comprising subjecting a protein containing material to a sequence of treatment steps involving salts containing no heavy metal ions and uranyl acetate.

1 Claims, No Drawings

FRACTIONATION OF PROTEINS

This invention relates to an improved process for the separation or fractionation of proteins, and more particularly of enzymes.

In recent years, protein preparations and enzymes have become of increasing importance and are needed in ever increasing amounts for technical and medicinal applications. The methods available up until now for the preparation of these materials on a large scale have been adaptations of laboratory scale procedures which have not proved satisfactory in that the laboratory procedures did not lend themselves to large scale processing. Thus, for example in connection with the concentration of enzymes on a laboratory scale, multiple fractionations with ethanol or acetone are carried out which lead to the accummulation of relatively large volumes which in turn necessitate centrifuging at very high gravity acceleration values, such as can, in practice, only be achieved in the case of relatively small centrifuges. Similarly, dialyses where very large volumes are involved are difficult to carry out and frequently result in damage caused to the enzymes involved. Therefore, in such cases, it is necessary to resort to multiple procedures or, where possible, to the use of another process.

The number of processes available for the separation or fractionation of proteins is very limited and these often are subject to many disadvantages including incomplete separations, low yields, etc.

Apart from the difficulties associated with the available procedures for carrying out the separation and purification of proteins or enzymes on a large scale, there exists a need for new procedures, which are also suitable for use on a laboratory scale, for carrying out the purification and fractionation of proteins and enzymes. The need however is particularly acute for methods which are suitable, both on a laboratory scale and on a large scale.

The conventional biochemical methods, employed in the separation of proteins and enzymes include precipitation, i.e., a fractionation or separation of the proteins by the addition of salts to aqueous solutions of these substances. For this purpose, in many cases it is preferred to use ammonium sulfate. However, such salt precipitations or fractionations are not suitable in connection with numerous enzymes, such as for instance, sorbite dehydrogenase and citrate lyase, as the enzymes are inactivated and undergo a coarse flocculation during the salt precipitation. Other enzymes, such as lactate dehydrogenase, enolase and glyceraldehyde phosphate dehydrogenase precipitate out during the salt fractionation in the form of such fine particles that, on a large scale, they can hardly, if at all, be separated by centrifuging. Furthermore, salt precipitations have the disadvantage that they frequently only provide a poor separation of the various proteins so that either the separation is inefficient or only poor yields are obtained.

It is also known to deproteinize solutions by the addition of uranyl acetate thereto. Furthermore, it is also known ("-Methoden der Fermentforschung", Bamann/Myrbäck, 2, 1741/1941), that fructosidase can be precipitated out of solution by means of uranyl acetate, without any loss of its activity. In "Methods in Enzymology", Volume 1, 340/1955, Colowick and Kaplan, there is described, in connection with a procedure for the enrichment of glucose aerodehydrogenase (Penicillin B), the precipitation thereof with uranyl acetate. However, a fractionation carried out with uranyl acetate was not successful, It was not to have been expected in view of the known sensitivity of proteins to heavy metal ions, that a fractionation of proteins could be carried out even in the case of a particularly careful dosing of the uranyl acetate.

In accordance with the invention, it has now been found that a combined treatment utilizing both salts and uranyl acetate permits the separation or fractionation of proteins to be carried out which cannot be achieved either with salt or with uranyl acetate alone.

Thus, in accordance with this invention, there is provided a process for the separation or fractionation of proteins, and particularly of enzymes, which comprises subjecting protein or enzyme containing materials to treatment with salts containing no heavy metal ions, and to treatment with uranyl acetate.

In carrying out the process according to the present invention, the treatment with the salt and uranyl acetate can be carried out successively or simultaneously. In accordance with the invention it has been found to be advantageous to carry out the treatment with uranyl acetate following treatment with the salt.

Specific examples of salts which may be used for separation of proteins include all of the salts known in protein chemistry which do not contain any heavy metal ions. Examples of acids which provide the anions of the salts include inorganic acids, such as sulfuric acid, hydrochloric acid, nitric acid, phosphoric acid, boric acid and the like, as well as organic acids, such as acetic acid, formic acid, lactic acid, citric acid and the like. As cations, there can be considered, for example, the alkali metals, such as sodium, potassium and lithium, the alkaline earth metals, and the earth metals, such as magnesium and aluminum, as well as substituted and unsubstituted ammonium ions. Preferred salts include sodium sulfate, sodium chloride and ammonium chloride, the most preferred salt being ammonium sulfate.

The salts, in the form of their aqueous solutions, can be mixed with aqueous solutions, suspensions or homogenizates of the proteins. However, it is also possible to add the salts in solid form to aqueous media containing the proteins provided that care is taken that localized areas of high concentrations do not occur. This can be prevented by stirring or by similar means.

The uranyl acetate is preferably used in the form of its dilute solutions. However, it is also possible to use concentrated solutions or solid uranyl acetate in finely powdered form if a uniform concentration thereof is ensured by rapid stirring. In this case, it does not matter if, for a short period of time, a precipitation of the protein occurs due to too high a concentration since it is precisely a characteristic of the combined treatment according to the present invention that precipitated proteins can easily be brought into solution again. When, due to the presence of local concentrations which are too high, proteins are precipitated out which were to remain in solution, these are redissolved as soon as an equilibration of the concentration has taken place.

The process according to the present invention can be carried out at pH values ranging between about 3.5 and about 7. In the case of higher pH values, an insoluble hydroxide is formed, whereas in the case of substantially lower pH values, the proteins are partially denatured. It is preferred to work at a pH value between 5 and 7.

The process according to the present invention permits a sharp separation of protein mixtures by fractional precipitation or fractional elution, which in many cases previously could not be accomplished, and also allows for the avoidance of process steps which can admittedly be carried out on a laboratory scale but not on a large scale.

Thus, for example, the process previously described by Chase et al. (B.B.A., 96, 162/1965) for the isolation of acetyl carnitine transferase (ACT) could not be carried out on a large scale since it involved homogenizing at a temperature of $-5°$ C. with three volumes of 20 percent ethanol which contained 0.4N potassium chloride, followed by centrifuging at 23,000 g and subsequent dialysis. This extraction process cannot be carried out on a large scale since, in the case of an application of the process on a 10 to 50 kg scale, centrifuges of very large capacity would be needed which could not achieve the necessary gravitational accelerations and, furthermore, dialysis apparatus of the necessary dimensions are not available. In addition, dialysis on a large scale involves certain risks and frequently results in damage to or inactivation of the protein.

With the process according to the present invention, these difficulties are overcome in that, for example, comminuted, frozen pigeon breast muscle, after a preextraction with ice water, followed by hydraulically pressing, is homogenized with a dilute solution of ammonium sulfate and a very dilute solution of uranyl acetate and then again subjected to hydraulical pressing. The enzyme fractionated in this manner and which has gone into solution is separated from the inactive foreign proteinaceous materials by the addition of a further amount of uranyl acetate in admixture with sodium chloride, and subsequently precipitated out by increasing the concentration of the ammonium sulfate. After carrying out a few further purification steps, there is obtained a crystallized enzyme having specific activity of about 120 units per mg in comparison with 118 units per mg in the case of Chase's process. Whereas in the case of the Chase process, the yield only amounts to 7.2 percent, with the process according to the present invention, yields of more than 31 percent are obtained. Furthermore, in spite of carrying out the process on a scale which is about 20 times greater, the working time necessary is reduced from 7–8 days to 3 days.

The invention is more particularly described and explained by means of the following Examples, which, however, are not intended to limit the scope of the invention.

EXAMPLE 1

Process for the recovery of pure, crystalline acetylcarnitine transferase (ACT)

5 kg pigeon breast muscle were finely comminuted mechanically with 3 volumes of cold, desalinated water and, following the addition thereto of filter flakes, hydraulically pressed. The clear extract from the pressing contained half of the soluble proteins but none of the ACT.

The press residue was homogenized with 10 litres 0.5 M ammonium sulfate solution having a pH of 7.3 and 5 litres of 0.32 percent uranyl acetate solution in 0.9 percent sodium chloride solution for a period of 5 minutes and the resultant batch again subjected to pressing. The liquid obtained in this second pressing contained all of the enzyme, however, contaminated with considerable amounts of foreign proteins. 6 Liters 0.16 percent uranyl acetate solution were then added to 14 liters of the liquid containing the enzyme and the combined liquid centrifuged for 30 minutes. The precipitate did not contain any active enzyme protein. 6.2 kg solid ammonium sulfate were added with stirring to 18 liters of supernatant liquid and this was then centrifuged for 1 hour. The precipitate which was thereby obtained contained the ACT. The precipitate was taken up in water to make a volume of 1.2 liters the ammonium sulfate concentration thereof amounting to 0.6 M. 1 liter of 0.16 percent uranyl acetate solution was then added and any further amounts of precipitated accompanying proteins centrifuged off. Thereafter, the ammonium sulfate concentration in the supernatant liquid was adjusted to 2.3 M and the precipitate which formed dissolved in water. 260 g CM-Sephadex were added and the enzyme adsorbed thereon. The CM-Sephadex carrying adsorbed enzyme was filtered off, washed once with 0.1 M phosphate buffer having a pH value of 6.0, and containing 0.1 M potassium chloride. The enzyme was desorbed by eluting the CM-Sephadex two times using for each elution 500 ml of 0.2 M phosphate buffer having a pH value of 6.0 and which contained 0.2 M potassium chloride. The enzyme was precipitated out from the eluate by increasing the ammonium sulfate concentration thereof to 2.25 M and centrifuged off. The precipitate was then taken up in water and dialyzed against 0.02 M phosphate buffer.

Any colored accompanying proteins were removed by chromatographing on DEAE-Sephadex. The ACT was eluted with 0.06 M phosphate buffer having a pH value of 7.6 and the enzyme contained in the main fraction precipitated out with ammonium sulfate. The enzyme which was thereby crystallized out was then suspended in 2.4 M ammonium sulfate solution.

In the following Table which follows there is set out a summary of the above-described enrichment stages. The yield of pure ACT amounted to about 31 percent. The product only contained traces of other enzymes, for example, lactate dehydrogenase in an amount of 0.008 percent and acetate kinase in an amount of 0.007 percent.

TABLE I
[ACT ISOLATION FROM 5 KG PIGEON BREAST MUSCLE]

| Purification step | Volume, litres | Total protein in g. | ACT total units | Specific activity, U/mg. protein | Yield, percent |
|---|---|---|---|---|---|
| Water extract | 15.0 | 210 | $1.1 \times 10^3$ | 0.0052 | |
| Ammonium sulfate/uranyl acetate extract | 14.0 | 228 | $1.72 \times 10^5$ | 0.755 | 100 |
| Supernatant first uranyl acetate precipitate | 18.0 | 64.2 | $1.74 \times 10^5$ | 2.71 | 100 |
| Ammonium sulfate precipitate | 1.2 | 42 | $1.41 \times 10^5$ | 3.36 | 82 |
| Supernatant second uranyl acetate precipitate | 2.1 | 16.8 | $1.20 \times 10^5$ | 7.15 | 70 |
| Taken up ammonium sulfate precipitate | 4.5 | 10.7 | $1.08 \times 10^5$ | 10.1 | 63 |
| CM-Sephadex eluate precipitated with ammonium sulfate | 0.20 | 2.31 | $6.8 \times 10^4$ | 29.5 | 39.5 |
| DEAE-Sephadex eluate | 0.42 | 0.490 | $5.6 \times 10^4$ | 114 | 32.5 |
| Final preparation (ammonium sulfate suspension) | 0.050 | 0.458 | $5.45 \times 10^4$ | 119 | 31 |

EXAMPLE 2

An experiment was conducted for comparison purposes in which the fractional elution of acetylcarnitine transferase was carried out first with ammonium sulfate solution alone and in second run with an ammonium sulfate solution of the same concentration but which contained uranyl acetate.

1 kg amounts of pigeon breast muscle were homogenized with (a) 3 liters 0.5 M ammonium sulfate solution and (b) with 3 liters 0.5 M ammonium sulfate solution which contained 0.1 percent uranyl acetate. The homogenizates which were obtained were centrifuged and the supernatants tested for acetylcarnitine transferase by the procedure described by Chase et al. (B.B.A., 96, 162/1965). The supernatant obtained from experiment (b) was mixed with a further 1.2 liters 0.16 percent uranyl acetate solution and any precipitated foreign protein separated off by centrifuging. The supernatant obtained from this centrifuging was labeled supernatant (c). The results which were obtained are set out in Table II which follows:-

TABLE II

| Volume in liters | total units | total protein | specific activity |
|---|---|---|---|
| (a) 2.63 | $1.52 \times 10^4$ | 74.5 g | 0.204 |
| (b) 2.80 | $1.73 \times 10^4$ | 42.9 g | 0.405 |
| (c) 3.80 | $1.28 \times 10^4$ | 6.2 g | 2.07 |

EXAMPLE 3

In this Example, a fractionation process according to the present invention, using various salts and employing a solution containing crude acetyl-carnitine transferase is described.

200 g pigeon breast muscle were homogenized with 600 ml cold water and centrifuged at high speed. The supernatant, hereinafter referred to as "water extract" was discarded. The precipitate which contained the enzyme was divided up into five portions of equal volume, each of which was homogenized with three times its volume of a 0.5 M salt solution having a pH value of 7.0. The salts which were used were ammonium sulfate, sodium sulfate, sodium chloride, ammonium chloride and magnesium acetate. The homogenizates where then centrifuged. 25 ml amounts of the supernatant (referred to as "-salt extract" in Table III) were analyzed for their respective protein content, total number of ACT units and effectiveness (specific activity in U/mg). Thereafter, each of the salt extracts where thoroughly mixed with 20 ml 0.16 percent uranyl acetate solution and immediately freed from precipitated protein by centrifuging. The supernatants thereby obtained were again analyzed.

As can be seen from Table III, which follows, the specific activity increased about fourfold in the case of all of the salts used. Only in the case of the magnesium acetate extract was only a double purification achieved.

precipitate thereby obtained contained 7 percent of the activity and almost all of the colored accompanying protein. The colorless supernatant, which could be heated to 40° C without any loss of activity, contained about 90 percent of the activity

TABLE III

[Uranyl acetate precipitation of ACT from pigeon breast muscle in 0.5M extracts containing various salts]

| Step | Ammonium sulfate | | | Sodium sulfate | | | Sodium chloride | | |
|---|---|---|---|---|---|---|---|---|---|
| | Protein, mg. | Units | U/mg. | Protein, mg. | Units | U/mg. | Protein, mg. | Units | U/mg. |
| Water extract | 395 | 10.8 | 0.027 | 395 | 10.8 | 0.027 | 395 | 10.8 | 0.027 |
| Salt extract | 440 | 357 | 0.81 | 540 | 408 | 0.76 | 412 | 394 | 0.95 |
| First uranyl acetate-supernatant | 101 | 344 | 3.4 | 93.6 | 321 | 3.43 | 59.4 | 219 | 3.7 |

| Step | Ammonium chloride | | | Magnesium acetate | | |
|---|---|---|---|---|---|---|
| | Protein, mg. | Units | U/mg. | Protein, mg. | Units | U/mg. |
| Water extract | 395 | 10.8 | 0.027 | 395 | 10.8 | 0.027 |
| Salt extract | 425 | 371 | 0.87 | 374 | 380 | 1.02 |
| First uranyl acetate supernatant | 53.5 | 269 | 5.0 | 111 | 214 | 1.93 |

EXAMPLE 4
Precipitation of serum albumin using uranyl acetate at various salt concentrations Serum albumin was dissolved, at a rate of 10 mg/ml in (a) water, (b) 0.5N ammonium sulfate solution and (c) 1.0 M ammonium sulfate solution. A "separation" was carried out by the stepwise addition of 0.16 percent uranyl acetate solution followed by centrifugation of the precipitated protein.

6 ml amounts of the serum albumin solutions were mixed five times using 1 ml amounts of the uranyl acetate solution for each mixing and, after centrifuging off the protein still present, the supernatant was tested using the biuret reaction. The results obtained are summarized in Table IV which follows:

TABLE IV

Precipitation of albumin with uranyl acetate. The values correspond to the total protein (in mg.) in the starting solution and in the subsequent supernatants of the uranyl acetate precipitation; pH = 6.0

| Albumin in | 0 | 1 | 2 | 3 | 4 | 1 5 |
|---|---|---|---|---|---|---|
| Water | 46.9 | 32.1 | 0 | 0 | 0 | 0 |
| 0.5M (NH₄)₂SO₄ | 44.4 | 44.0 | 36.9 | 8.9 | 0 | 0 |
| 1.0M (NH₄)₂SO₄ | 44.4 | 44.6 | 38.1 | 18.5 | 4.7 | 0 |

¹ Ml. 0.16% uranyl acetate.

From Table IV it can be seen that, even with the addition of a small amount of uranyl acetate, all of the protein is precipitated out from aqueous solutions containing the same. On the other hand, on increasing the salt concentration, a smaller amount of protein is precipitated using the same amount of uranyl acetate.

EXAMPLE 5
Fractionation of pyruvate decarboxylase

In the isolation of pyruvate decarboxylase from Brewers' yeast, it is hardly possible to remove the colored accompanying proteins, even in the case of highly enriched enzyme preparations. The experiment described in this Example establishes that this problem can be avoided by means of the process according to the present invention.

40 ml colored, semi-purified pyruvate decarboxylase solution, containing 19 U/ml in 1.0M ammonium sulfate solution having a pH value of 5.7 were mixed with 30 ml of a 0.16 percent uranyl acetate solution having a pH value of 5.5. The precipitate thereby obtained contained 7 percent of the activity and almost all of the colored accompanying protein. The colorless supernatant, which could be heated to 40° C without any loss of activity, contained about 90 percent of the activity at 39 U/mg. The carboxylase present could be precipitated out quantitatively using ammonium sulfate.

EXAMPLE 6
Separation of lactate dehydrogenase precipitate

The experiment described in this Example shows that the combinations used according to the process of the present invention behaves synergistically in the separation of a lactate dehydrogenase precipitate.

100 mg lactate dehydrogenase, having a specific activity of 360 U/mg which had been obtained from rabbit muscle, were centrifuged and the precipitate formed dissolved in water made up to 10 ml. The pH value of the solution amounted to 6.5. The enzyme, in amounts of 10 mg/ml was diluted with water, 0.3M ammonium sulfate solution, 0.6M ammonium sulfate solution and 0.9M ammonium sulfate solution to provide an enzyme concentration of 2 mg/ml. All of the enzyme solutions thus obtained contained 2 mg protein/ml and had a pH value of 6.5. They were each then fractionally precipitated with 0.16 percent uranyl acetate solution.

The results which were obtained are set out in Table V which follows:

TABLE V

| 5 ml. = 10 mg. (LDH 2 mg./ml.) in— | Percent initial activity of LDH | | | | | | | |
|---|---|---|---|---|---|---|---|---|
| | 0 | | 0.5 ml. URAC | | 1.0 ml. URAC | | 2 ml. URAC | |
| | Ppt. | Snt. | Ppt. | Snt. | Ppt. | Snt. | Ppt. | Snt. |
| Water | | 100 | 98 | 1.6 | 98 | 0 | 97 | 0 |
| 0.3M (NH₄)₂SO₄ | | 100 | 62 | 36.2 | 97 | 0.3 | 96 | 0 |
| 0.6M (NH₄)₂SO₄ | | 100 | 1.0 | 95 | 70 | 22.8 | 97 | 1.6 |
| 0.9M (NH₄)₂SO₄ | | 100 | 0 | 96 | 1.5 | 96 | 86.5 | 10.9 |

LDH = Lactate dehydrogenase.
URAC = 0.16% uranyl acetate solution.
Ppt. = Precipitate.
Snt. = Supernatant.

We claim:

1. Process for fractionating mixtures of proteins containing acetylcarnitine transferase into their component fractions which process comprises separating said acetylcarnitine transferase from its mixture with other proteins by the steps of treating an aqueous homogenate of protein with a dilute solution of a heavy metal cation free salt selected from the group consisting of alkali metal salts, alkaline earth metal salts, earth metal salts and ammonium salts; and with a dilute solution of uranyl acetate, separating off the liquid from the solid material, introducing a dilute solution of uranyl acetate, separating out the inactive protein thereby precipitated, introducing a further amount of at least one of said heavy metal cation free salt and recovering the acetylcarnitine transferase thereby precipitated.

* * * * *